US006854554B2

(12) United States Patent
Brandt et al.

(10) Patent No.: US 6,854,554 B2
(45) Date of Patent: Feb. 15, 2005

(54) JOYSTICK STEERING ON POWER MACHINE WITH FILTERED STEERING INPUT

(75) Inventors: Kenneth A. Brandt, Wyndmere, ND (US); Scott R. Rossow, Kindred, ND (US)

(73) Assignee: Clark Equipment Company, Montvale, NJ (US)

( * ) Notice: Subject to any disclaimer, the term of this patent is extended or adjusted under 35 U.S.C. 154(b) by 426 days.

(21) Appl. No.: 09/738,402

(22) Filed: Dec. 15, 2000

(65) Prior Publication Data

US 2002/0074181 A1 Jun. 20, 2002

(51) Int. Cl.[7] .......................... B60K 26/00; G05G 9/00

(52) U.S. Cl. ................................ 180/333; 74/471 XY

(58) Field of Search ................................ 180/315, 333; 74/471 XY

(56) References Cited

U.S. PATENT DOCUMENTS

| | | | | | |
|---|---|---|---|---|---|
| 3,620,321 | A | | 11/1971 | Thibodeau | 180/41 |
| 3,724,585 | A | | 4/1973 | Conrad | 180/79.2 |
| 3,746,150 | A | | 7/1973 | Briggs | 198/233 |
| 3,876,020 | A | * | 4/1975 | Barsby | 180/333 |
| 4,175,638 | A | | 11/1979 | Christensen | 180/140 |
| 4,398,616 | A | | 8/1983 | Braden et al. | 180/140 |
| 4,446,941 | A | | 5/1984 | Laurich-Trost | 180/236 |
| 4,621,702 | A | | 11/1986 | Kanazawa et al. | 180/140 |
| 4,688,443 | A | * | 8/1987 | Fabre et al. | 318/564 |
| 4,726,442 | A | * | 2/1988 | Hansen | 180/332 |
| 4,738,417 | A | * | 4/1988 | Wenger | 244/234 |
| 4,782,906 | A | | 11/1988 | Kole | 180/23 |
| 5,033,000 | A | * | 7/1991 | Littlejohn et al. | 180/272 |
| 5,111,901 | A | | 5/1992 | Bachhuber et al. | 180/140 |
| 5,127,658 | A | * | 7/1992 | Openiano | 446/130 |
| 5,143,159 | A | * | 9/1992 | Young et al. | 172/8 |
| 5,160,918 | A | | 11/1992 | Saposnik et al. | 340/709 |
| 5,190,111 | A | * | 3/1993 | Young et al. | 172/7 |
| 5,217,083 | A | | 6/1993 | Bachhuber et al. | 180/140 |
| 5,291,407 | A | * | 3/1994 | Young et al. | 701/50 |
| 5,320,186 | A | * | 6/1994 | Strosser et al. | 172/8 |
| 5,362,269 | A | * | 11/1994 | Leach | 114/144 R |
| 5,379,220 | A | | 1/1995 | Allen et al. | 364/424.05 |
| 5,409,074 | A | * | 4/1995 | Wilson et al. | 180/333 |
| 5,417,126 | A | * | 5/1995 | DeCrouppe et al. | 74/473.1 |
| 5,417,299 | A | | 5/1995 | Pillar et al. | 180/140 |
| 5,451,852 | A | * | 9/1995 | Gusakov | 318/611 |
| 5,456,332 | A | * | 10/1995 | Borenstein | 180/167 |
| 5,533,584 | A | | 7/1996 | Johnson | 180/415 |
| 5,607,028 | A | * | 3/1997 | Braun et al. | 180/408 |
| 5,618,156 | A | | 4/1997 | Brown | 414/694 |
| 5,659,473 | A | | 8/1997 | Noro et al. | 364/424.052 |
| 5,752,578 | A | | 5/1998 | Kellogg | 180/414 |
| 5,787,374 | A | | 7/1998 | Ferguson et al. | 701/41 |
| 5,919,241 | A | | 7/1999 | Bolourchi et al. | 701/41 |
| 5,931,881 | A | | 8/1999 | Gustin et al. | 701/41 |
| 5,996,342 | A | * | 12/1999 | Khan et al. | 60/421 |
| 5,996,722 | A | | 12/1999 | Price | 180/403 |
| 6,186,265 | B1 | * | 2/2001 | Boehringer et al. | 180/402 |
| 6,233,511 | B1 | * | 5/2001 | Berger et al. | 414/699 |
| 6,437,318 | B1 | * | 8/2002 | Egloff et al. | 250/225 |
| 6,578,358 | B1 | * | 6/2003 | Schuh | 60/448 |
| 6,580,418 | B1 | * | 6/2003 | Grome et al. | 345/161 |

FOREIGN PATENT DOCUMENTS

EP 0 266 829 A1 10/1987

OTHER PUBLICATIONS

Moderne Hydrostatische Antriebs–systeme mit Mikroprozessorsteuerungen fur mobile Arbeitsmaschinen O+P (1999) By: Stefan Rinck XP–000834214.

* cited by examiner

*Primary Examiner*—Paul N. Dickson
*Assistant Examiner*—Joselynn Y. Sliteris
(74) *Attorney, Agent, or Firm*—Joseph R. Kelly; Westman, Champlin & Kelly, P.A.

(57) ABSTRACT

A user input device in accordance with one features of the present invention includes one or more joysticks, movable by a user in an operator compartment of a power machine. The joysticks control direction of movement of the power machine, as well as travel speed.

23 Claims, 5 Drawing Sheets

JOYSTICK STEERING ON POWER MACHINE WITH FILTERED STEERING INPUT

REFERENCE TO CO-PENDING APPLICATION

The present application claims priority from co-pending U.S. patent application Ser. No. 09/733,622, filed Dec. 8, 2000, the content of which is hereby incorporated by reference in its entirety.

BACKGROUND OF THE INVENTION

The present invention generally relates to user input devices for power machines. In particular, the present invention relates to a filtered joystick input to a power machine.

Power machines, such as loaders, typically have a number of power actuators. Such actuators can include, for example, drive actuators which provide traction power to the wheels or tracks of the machine. The actuators can also include those associated with manipulating a primary working tool, such as a bucket. In that case, the actuators include lift and tilt actuators. Of course, a wide variety of other actuators can also be used on such power machines. Examples of such actuators include auxiliary actuators, hand-held or remote tool actuators or other actuators associated with the operation of the power machine itself, or a tool coupled to the power machine.

The various actuators on such power machines have conventionally been controlled by mechanical linkages. For example, when the actuators are hydraulic actuators controlled by hydraulic fluid under pressure, they have been controlled by user input devices such as handles, levers, or foot pedals. The user input devices have been connected to a valve spool (of a valve which controls the flow of hydraulic fluid under pressure to the hydraulic actuator) by a mechanical linkage. The mechanical linkage transfers the user input motion into linear displacement of the valve spool to thereby control flow of hydraulic fluid to the actuator.

Electronic control inputs have also been developed. The electronic inputs include an electronic sensor which senses the position of user actuable input devices (such as hand grips and foot pedals). In the past, such sensors have been resistive-type sensors, such as rotary or linear potentiometers.

SUMMARY OF THE INVENTION

A user input device in accordance with one feature of the present invention includes one or more joysticks, movable by a user in an operator compartment of a power machine. The joysticks control direction of movement of the power machine, as well as travel speed.

It has been found that, under certain operating conditions, relative movement of the user and the power machine can cause unwanted movement of the joysticks. For example, if the power machine is moving over rough terrain, the user may inadvertently move the joystick, thereby causing undesired control input to the power machine.

Therefore, in accordance with one aspect of the present invention, the joystick is coupled to a position sensor which senses position of the joystick. The position sensor, in turn, is coupled to a filter which filters out high frequency movement of the joystick. In one embodiment, the filter is a low pass filter implemented as a hardware component. In another embodiment, the filter is implemented in a software component used to control the power machine.

DETAILED DESCRIPTION OF THE ILLUSTRATIVE EMBODIMENTS

Figure 1:
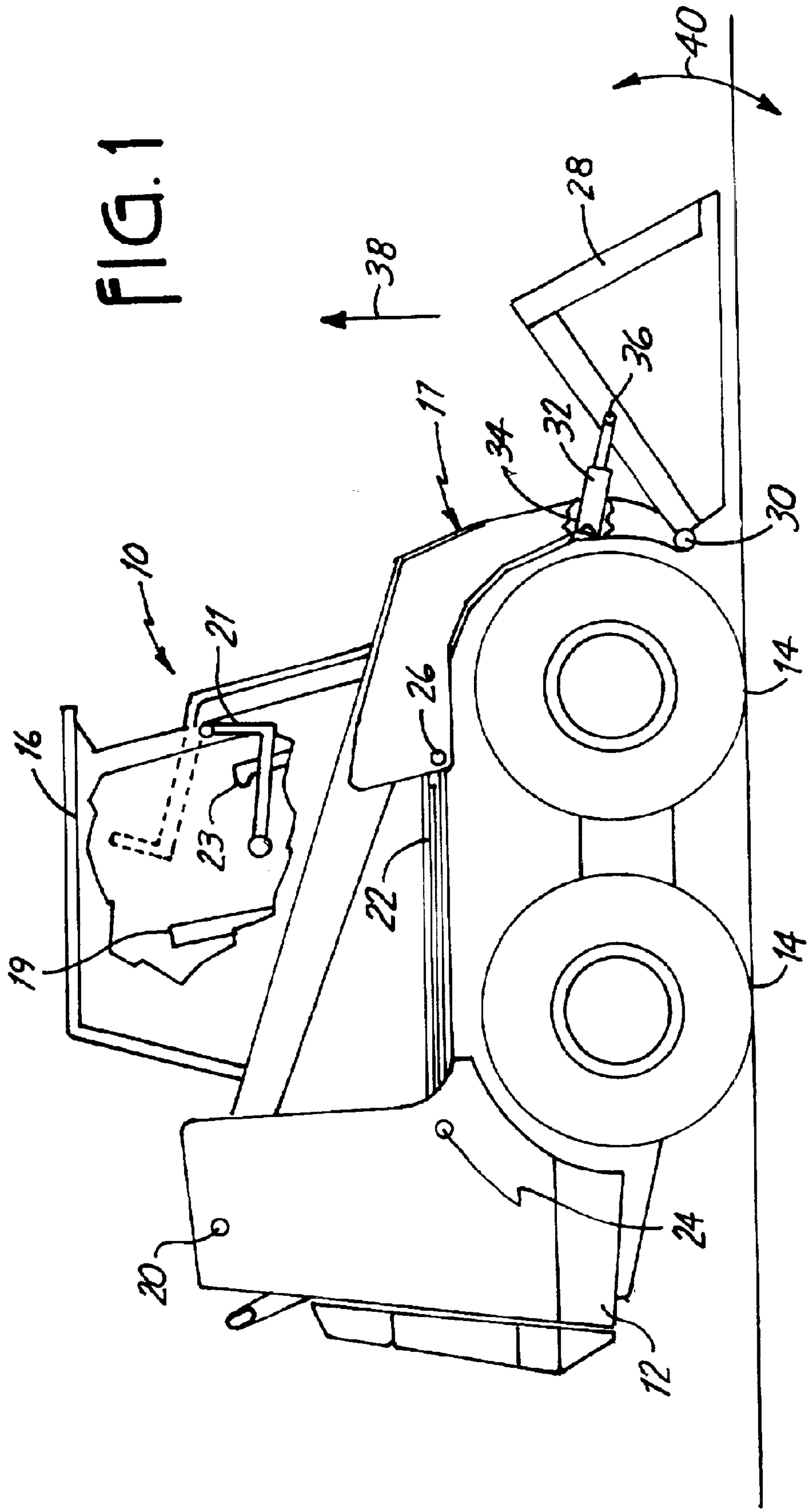
FIG. 1 is a side elevational view of a power machine in accordance with one embodiment of the present invention.
Figure 1A:
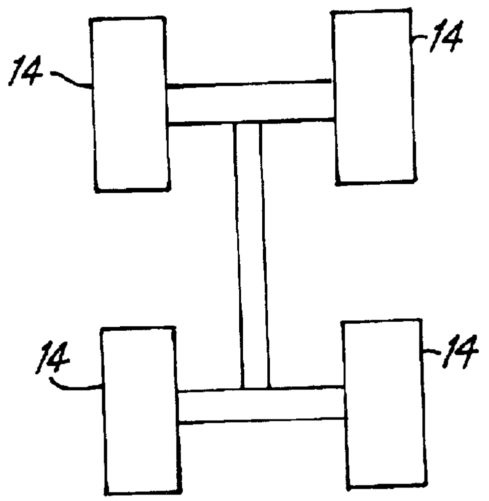
FIG. 1A–1E illustrates different steering modes.

FIG. 1 is a side elevational view of one embodiment of a loader 10 according to the present invention. Loader 10 includes a frame 12 supported by wheels 14. Frame 12 also supports a cab 16 which defines an operator compartment and which substantially encloses a seat 19 on which an operator sits to control skid steer loader 10. A seat bar 21 is optionally pivotally coupled to a (e.g. front or rear) portion of cab 16. When the operator occupies seat 19, the operator then pivots seat bar 21 from the raised position (shown in phantom in FIG. 1) to the lowered position shown in FIG. 1.

A pair of steering joysticks 23 (only one of which is shown in FIG. 1) are mounted within cab 16. In one embodiment, one of joysticks 23 is manipulated by the operator to control forward and rearward movement of loader 10, and in order to steer loader 10, while the other joystick 23 is manipulated to control functions of the loader and in order to steer loader. One embodiment of joystick 23 is illustrated in greater detail with respect to FIGS. 3A–3B.

A lift arm 17 is coupled to frame 12 at pivot points 20 (only one of which is shown in FIG. 1, the other being identically disposed on the opposite side of loader 10). A pair of hydraulic cylinders 22 (only one of which is shown in FIG. 1) are pivotally coupled to frame 12 at pivot points 24 and to lift arm 17 at pivot points 26. Lift arm 17 is coupled to a working tool which, in this embodiment, is a bucket 28. Lift arm 17 is pivotally coupled to bucket 28 at pivot points 30. In addition, another hydraulic cylinder 32 is pivotally coupled to lift arm 17 at pivot point 34 and to bucket 28 at pivot point 36. While only one cylinder 32 is shown, it is to be understood that any desired number of cylinders can be used to work bucket 28 or any other suitable tool.

The operator residing in cab 16 manipulates lift arm 17 and bucket 28 by selectively actuating hydraulic cylinders 22 and 32. In prior loaders, such actuation was accomplished by manipulation of foot pedals in cab 16 or by actuation of hand grips in cab 16, both of which were attached by mechanical linkages to valves (or valve spools) which control operation of cylinders 22 and 32. However, in accordance with the present invention, this actuation is accomplished by moving a movable element, such as a joystick, foot pedal or user actuable switch or button on a hand grip on joystick 23 or a control panel and electronically controlling movement of cylinders 22 and 32 based on the movement of the movable element. In one embodiment, movement of the movable elements is sensed by a controller in the hand grip and is communicated to a main control computer used to control the cylinders and other hydraulic or electronic functions on a loader 10. Alternatively, movement of the movable elements can be provided directly to the main control computer (e.g., as an analog signal) and directly sensed by the main control computer.

By actuating hydraulic cylinders 22 and causing hydraulic cylinders 22 to increase in length, the operator moves lift arm 17, and consequently bucket 28, generally vertically upward in the direction indicated by arrow 38. Conversely, when the operator actuates cylinder 22 causing it to decrease in length, bucket 28 moves generally vertically downward to the position shown in FIG. 1.

The operator can also manipulate bucket 28 by actuating cylinder 32. This is also illustratively done by pivoting or actuating a movable element (such as a foot pedal or a hand grip on a joystick or a button or switch on a handgrip) and electronically controlling the flow of hydraulic oil to the cylinder 32 based on the movement of the element. When the operator causes cylinder 32 to increase in length, bucket 28 tilts forward about pivot points 30. Conversely, when the operator causes cylinder 32 to decrease in length, bucket 28 tilts rearward about pivot points 30. The tilting is generally along an arcuate path indicated by arrow 40.

While this description sets out many primary functions of loader 10, a number of others should be mentioned as well. For instance, loader 10 may illustratively include blinkers or turn signals mounted to the outside of the frame 12. Also loader 10 may include a horn and additional hydraulic couplers, such as front and rear auxiliaries, which may be controlled in an on/off or proportional fashion. Loader 10 may also be coupled to other tools which function in different ways than bucket 28. Therefore, in addition to the hydraulic actuators described above, loader 10 may illustratively include many other hydraulic or electronic actuators as well.

In one illustrative embodiment, loader 10 is an all-wheel steer loader. Each of the wheels is both rotatable and pivotable on the axle on which it is supported. Pivoting movement can be driven using a wide variety of mechanisms, such as a hydraulic cylinder, an electric motor, etc. For the sake of clarity, the present description will proceed with respect to the wheels being individually steered with hydraulic cylinders.

In addition, loader 10 illustratively includes at least two drive motors, one for the pair of wheels on the left side of the vehicle and one for the pair of wheels on the right side of the vehicle. Of course, loader 10 could also include a single drive motor for all four wheels, or a drive motor associated with each wheel.

Given that each of the wheels is independently steerable, controller 10 can be controlled in one of several modes illustrated by FIGS. 1A–1E. Controller 10 can be controlled in a normal skid steer mode (illustrated in FIG. 1A), in which all wheels are pointed straight ahead and left and right pairs of wheels are controlled to accomplish skid steering. In that configuration, a single joystick (e.g., the left joystick) illustratively controls forward and reverse rotation and speed of the wheels. Of course, two joysticks could be used in a traditional skid steer manner as well.

Figure 1B:
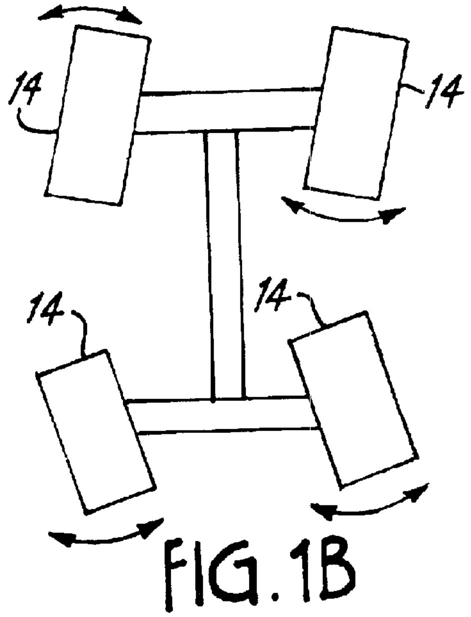

The loader can also illustratively be controlled in coordinated steer mode, illustrated in FIG. 1B. In this mode, the front wheels work together as a pair, and the rear wheels work together as a pair. For example, in order to accomplish a forward right hand turn, the front wheels turn toward the right while the rear wheels turn to the left causing the loader to turn more sharply.

Figure 1C:
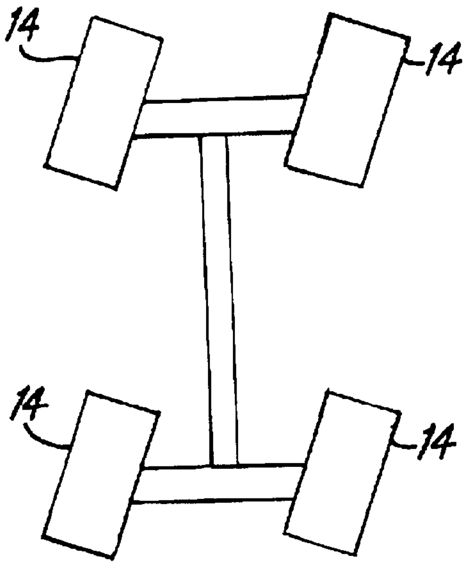

The loader can also be controlled in a crab steer mode, as illustrated in FIG. 1C. In that mode, again the front wheels act as a single pair of wheels and the rear wheels also act as a single pair. However, in order to accomplish a forward right hand turn, for instance, both the front and rear pairs of wheels turn toward the right. This causes loader 10 to move both forward and to the right in a diagonal direction relative to its longitudinal axis. Similarly, in order to accomplish a left-hand turn, both the front and rear pairs of wheels are turned toward the left. Again causing the loader to move in a generally diagonal direction, relative to its longitudinal axis.

Figure 1D:
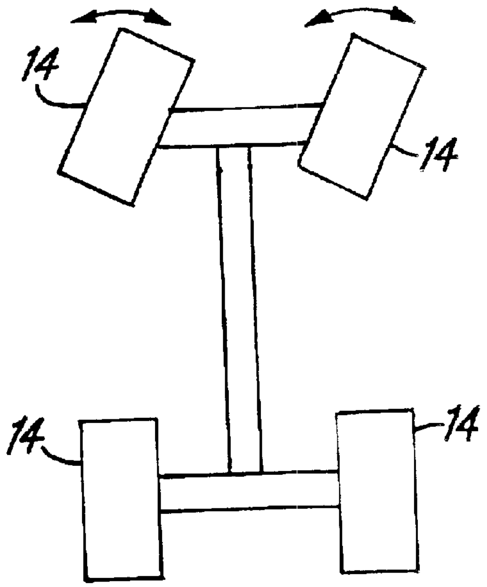
Figure 1E:
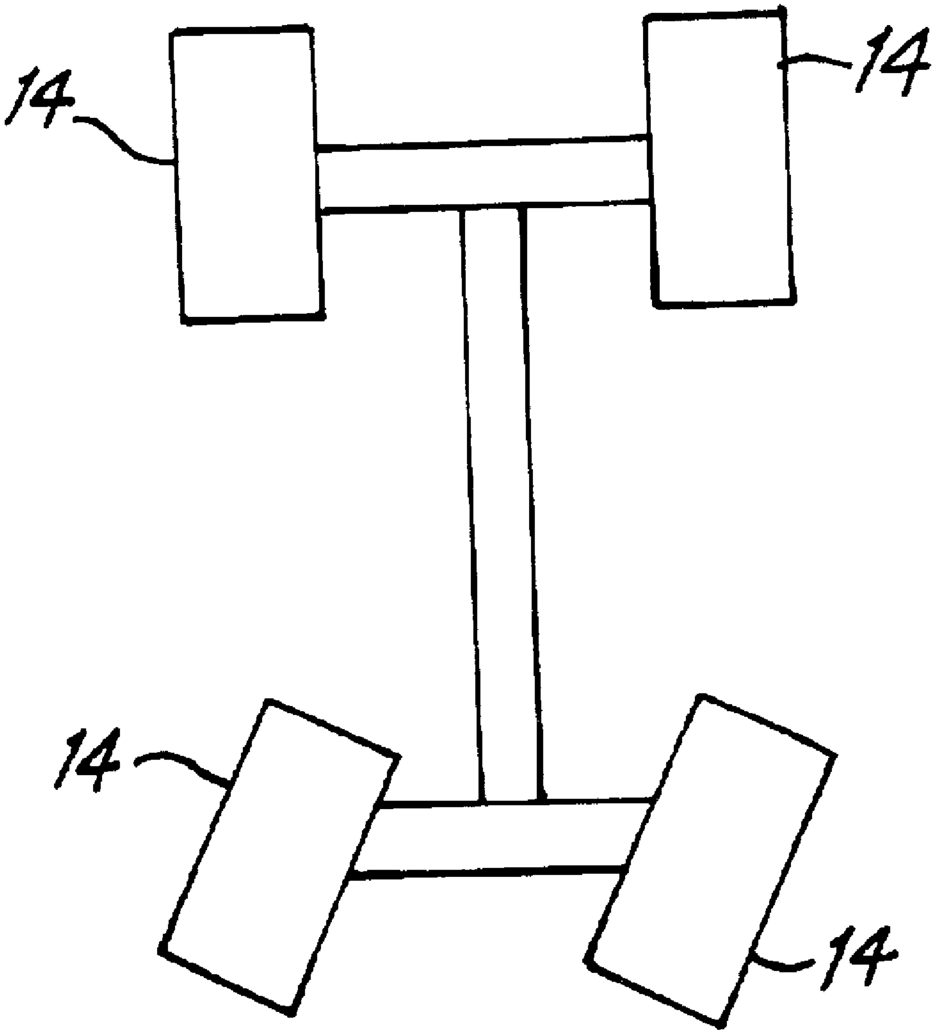

Of course, the loader can also be controlled (as illustrated in FIGS. 1D and 1E) using a front wheel steer mode (FIG. 1D) in which the front wheels steer in a customary fashion, or a rear wheel steer mode (FIG. 1E) in which the rear wheels steer the vehicle, the vehicle is illustratively steered using only a single joystick.

Figure 2:
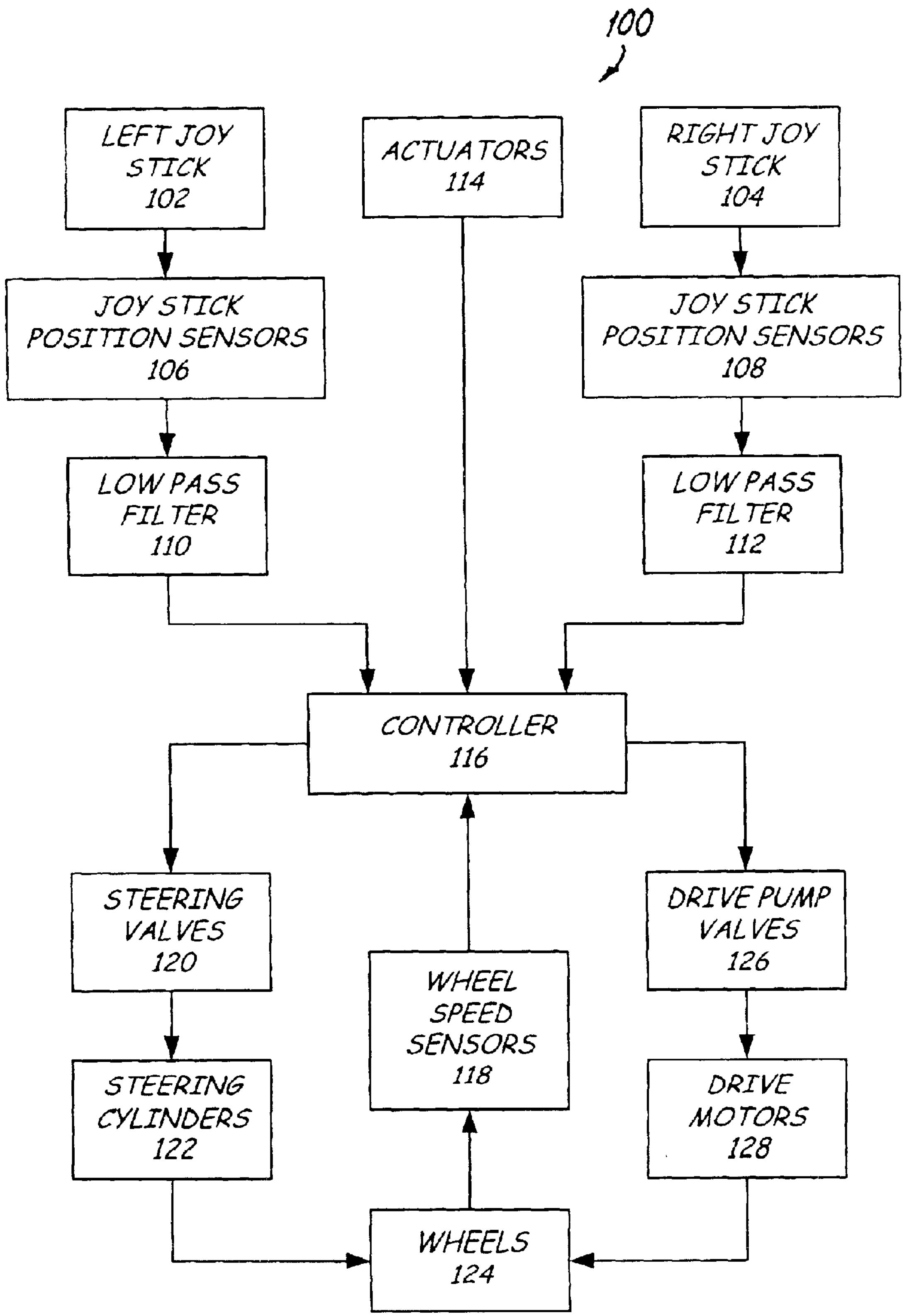
FIG. 2 is a block diagram of a control circuit in accordance with one embodiment of the present invention.

FIG. 2 is a block diagram of a control system 100 in accordance with one illustrative embodiment of the present invention. System 100 includes left joystick 102, right joystick 104 (collectively joysticks 23), joystick position sensors 106 and 108, low pass filters 110 and 112, actuator inputs 114, controller 116 and wheel speed sensors 118. FIG. 2 also illustrates steering valves 120, steering cylinders 122, wheels 124, drive motor valves 126 and drive motors 128.

In one embodiment, left and right joystick 102 and 104 illustratively include hand grips which are described in greater detail in co-pending U.S. patent application Ser. No. 09/733,622 entitled SELECTABLE CONTROL PARAMETERS ON POWER MACHINE, filed on Dec. 8, 2000. The handgrips are also discussed briefly with respect to FIG. 3. In one such embodiment, the handgrips include controllers or microprocessors which sense joystick movement and provide a position signal output indicative of displacement of the joysticks from neutral. In another embodiment, signals indicative of joystick movement are provided directly to the main control computer.

Joystick position sensors 106 and 108 are illustratively commercially available joystick position sensors which can be controller-implemented (such as software modules that convert a movement signal into other indicia of position) and which are coupled to joysticks 102 and 104, respectively. Joystick sensors 106 and 108 can illustratively sense the X and Y position of joysticks 102 and 104, relative to their central, neutral position. Joystick position sensors 106 and 108 illustratively convert the physical or mechanical movement of joysticks 102 and 104 into an electrical output signal which is provided, through low pass filters 110 and 112, to controller 116.

In one illustrative embodiment, low pass filters 110 and 112 filter out high frequency jitter provided by joystick position sensors 106 and 108. This has the effect of filtering out very rapid movements of joysticks 102 and 104 from the steering and speed functions. In one illustrative embodiment, filters 110 and 112 are configured to filter out changes in joystick position which are above approximately 2.5–3 Hz. This reduces undesirable steering characteristics based on erroneous operator inputs due to vehicle bouncing, or due to other movements which cause unwanted relative movement of the machine and operator.

In one illustrative embodiment, filters 110 and 112 are discrete filters implemented in hardware using one of any number of conventional filtering techniques. Of course, low pass filters 110 and 112 can be implemented in the software associated with controller 116 or the controller in the handgrips of joysticks 102 and 104, as well. In any case, controller 116 is configured to provide output control signals based on input signals from the joysticks which have maintained a steady state for a predetermined amount of time.

Controller 116 in one illustrative embodiment, is a digital computer, microcontroller, or other type of control component with associated memory and timing circuitry.

Wheel sensors 118 illustratively include magnetic sensors, Hall effect sensors, or other similar sensors which can sense the speed of rotation of wheels 124. In one illustrative embodiment, there is only a single wheel speed sensor 118 for the left pair of wheels and a single sensor 118 for the right pair of wheels. That sensor, of course, is mounted to only one of the left or right wheels, respectively. However, in another illustrative embodiment, there is a wheel speed sensor 118 configured to sense the rotational speed of each of the wheels 124.

In any case, wheel sensors 118 illustratively provide a pulsed output wherein the frequency of the pulses vary based on wheel speed. In one illustrative embodiment, the wheel speed sensors provided approximately 60 pulses per wheel rotation. Of course, wheel speed sensors 118 can also be mounted adjacent drive motors 128 which drive the wheels. In that case, wheel speed sensors 118 simply senses the speed of rotation of the motor, in any one of a wide variety of conventional fashions.

Joystick actuators 114 are illustratively push buttons, triggers, rocker switches, paddle or slide switches or other thumb or finger actuable inputs located on joysticks 102 and 104 or on the control panel or other conveniently accessed location. Such buttons illustratively include a mode switch for selecting one of the various steering modes discussed above.

The buttons also illustratively include a momentary skid steer switch. In that embodiment, when the momentary skid steer switch is depressed, the wheels 124 of the loader will quickly become aligned in a straight configuration and a single joystick 102 or 104 will be used for steering the loader in a skid steer mode. However, when the momentary skid steer switch is released, or deactuated, then the loader illustratively reverts to the steering mode which it was in prior to depression of the momentary skid steer switch, or to another predetermined steering mode.

In another illustrative embodiment, actuators 114 also function as trim actuators. In other words, when loader 10 is traveling across the face of a slope, the wheels can be trimmed in the up hill direction, to offset the weight of the machine and gravity which tends to pull the machine down hill. In one such embodiment, the trim actuators include a trim on/off button which simply turns on or off the trim function, and a trim right/left button which causes the wheels, when the trim function is enabled, to be turned a predetermined number of degrees to the right or left relative to the longitudinal axis of the vehicle. Of course, the trim right/left actuator could also be a rotary, linear slide-type actuator or another type of actuator, such that the degree of trim can be adjusted. When in the front wheel steer or rear wheel steer modes, only the steering wheels will illustratively be trimmed. The trim offset will then correspond to the neutral position of the joystick. Of course, the non-steering wheels could be trimmed instead of, or in addition to, the steering wheels.

In addition, actuators 114 illustratively include a plurality of settable parameters. Such parameters can include, for example, the maximum speed of the power machine. In other words, when joysticks 102 and 104 are placed in the position, by the user, to reflect maximum forward or reverse speed, that speed can illustratively be set by the user, or other personnel, prior to use. This can be done by changing software so the drive pump is stroked a sufficient distance, based on a maximum joystick displacement, to obtain no more than the desired maximum speed (as indicated by feedback from the wheel speed sensors 118). Again, that actuator can simply be a high/low actuator which causes the power machine to operate in a high speed or low speed fashion, or it can be a continuous actuator which causes the high speed to vary linearly from a lower speed to a higher speed.

In addition, the rate at which the loader accelerates based on user input can be varied with either discrete or linear settings. This same strategy can be implemented for steering features. For instance, the maximum turning radius of the power machine can be set. In that embodiment, when the user operates the joysticks 102 and 104 to accomplish a tight right or left turn, the maximum degree of turning of the wheels can be set by the operator. As with the acceleration response, the steering response can be varied. The rate at which the power machine turns in response to a user input, can be varied discretely between a high and low response (in which a high response mode is a more quick response than the low response mode) or it can be varied continuously per the user's input.

In addition, actuators 114 can include a deadband input. The deadband corresponds to the amount of movement which joysticks 102 and 104 can undergo without incurring a resultant response from controller 116. Illustratively, joysticks 102 and 104 have a deadband around their centered, neutral position such that the user can move the joystick slightly, without incurring a controller-based steering or acceleration response. The size of the deadband can be set in a similar fashion to the other settable parameters discussed above.

Based upon these inputs, controller 116 provides an output to drive pump valves 126 and steering valves 120. In one illustrative embodiment, drive motors 128 and steering cylinders 122 are hydraulically actuated devices. Therefore, steering valves 120 and drive pump valves 126 control the flow of hydraulic fluid under pressure to steering cylinders 122 and drive motors 128, respectively. In order to increase the speed of movement of the loader, drive pump valves 126 are positioned to provide increased flow of hydraulic fluid to drive motors 128 which are, in turn, coupled to wheels 124 through an axle. Similarly, in order to increase or decrease the amount that the wheels are steered relative to the longitudinal axis of the loader, valves 120 are positioned to provide hydraulic fluid under pressure to steering cylinder 122 to either lengthen those cylinders or shorten them. This, of course, causes the wheels to pivot about the axles to which they are mounted, to change the degree of steering associated with those wheels.

It can thus be seen that, because low pass filters 110 and 112 are positioned within control system 100, the control of wheels 124 is made more smooth, and less prone to unwanted, high frequency jitters.

Figure 3A:
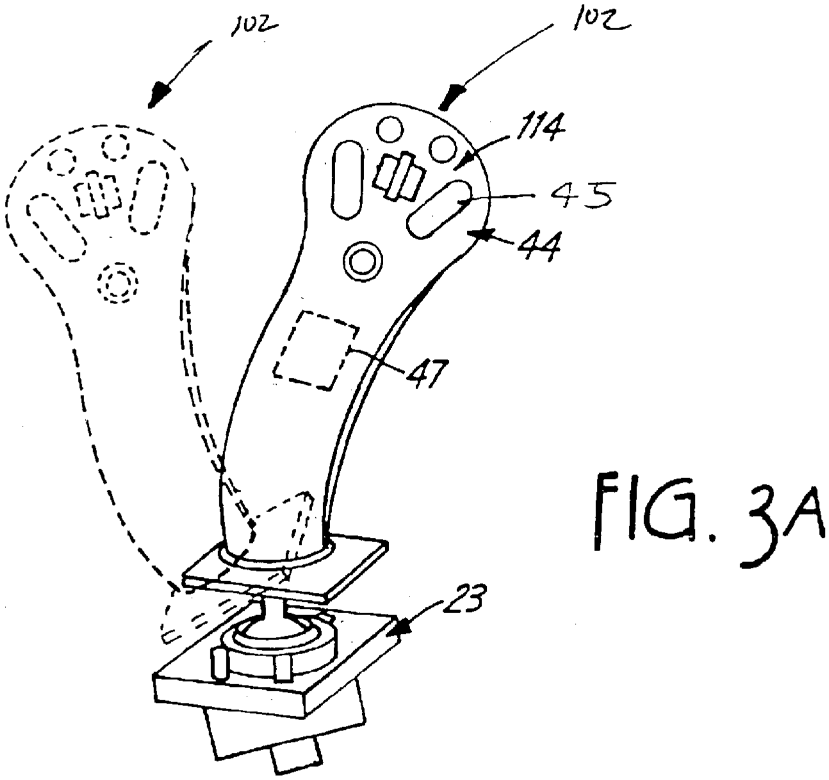
FIGS. 3A and 3B are views of one embodiment of a joystick used as a user input mechanism.
Figure 3B:
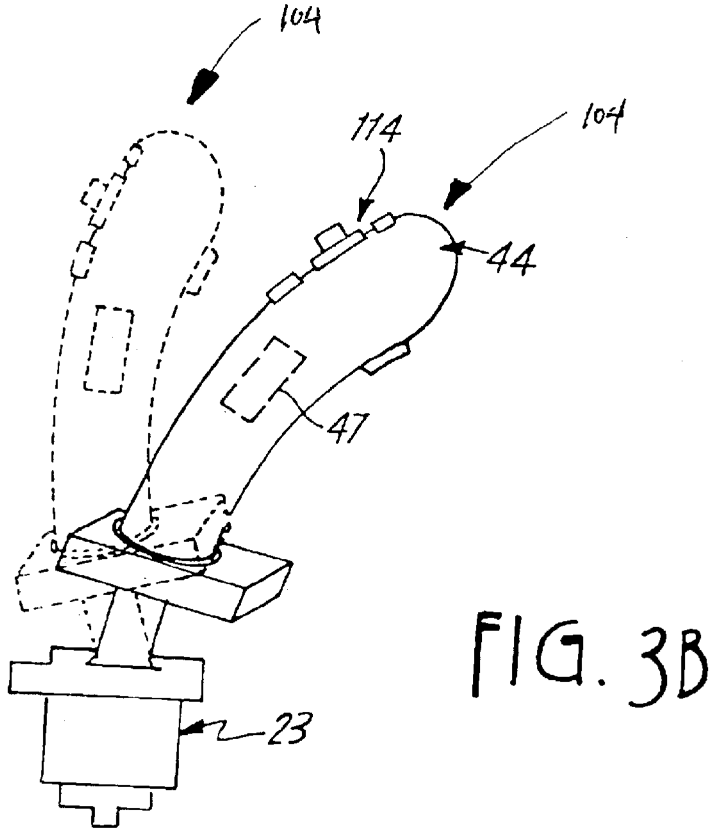

FIGS. 3A and 3B illustrate one embodiment of a handgrip 44 which is supported by one of joysticks 102 or 104. Of course, both joysticks can include similar or different handgrips. Also, while the present invention can be used with substantially any type of grip on joysticks 102 and 104, those illustrated in FIGS. 3A–3B are provided for exemplary purposes only.

In FIG. 3A, handgrip 44 is viewed from the rear (or operator) side, illustrating buttons 45. FIG. 3B is illustrated from the operator's right hand side. Both FIGS. 3A and 3B illustrate phantom figures which show handgrip 44 pivoted from its neutral position. In FIG. 3A, handgrip 44 is pivoted to the operator's left hand side (as shown in phantom) in the direction indicated by arrow 102. Of course, it will be noted that handgrip 44 can be pivoted to the user's right hand side as well. FIG. 3B shows hand grip 44 pivoted in the aft direction (toward the user as shown by arrow 104) as also shown in phantom. Of course, handgrip 44 can also be pivoted in the forward direction.

In one illustrative embodiment, the range of motion (from the solid image to the phantom image shown in both FIGS.

3A and 3B) is approximately 4.25 inches, and is offset by an angle of approximately 20 degrees. It should also be noted that, in one embodiment, joystick assembly 23 (other than the handgrips) is a commercially available joystick assembly produced and available from the Sauer Company.

FIGS. 3A and 3B also schematically illustrate controller 47 which is embedded within handgrip 44. In one illustrative embodiment, controller 47 is contained in a module with associated memory, that is embedded within the interior of hand grip 44 while a flex circuit couples buttons 114 to controller 47. In one embodiment, the exterior of hand grip 44 is hard or soft plastic or rubber, or a hard material with a friction increasing surface (such as texture or a softer gripping material) disposed where the user's hand engages the hand grip 44, such as under the palm region, the finger region and/or the finger tip region. The controller 47 (and possibly an associated circuit board) is illustratively, securely attached within an inner cavity of handgrip 44 through adhesive, screws, clamps or another mechanical attachment mechanism. In one illustrative embodiment, a three conductor serial communication link is provided between controller 47 and controller 116. The three conductors include power, ground, and a serial communication conductor. In another embodiment, controller 47 includes a wireless transmitter while controller 116 includes a wireless receiver. Wireless communication is then effected between the two using radiation, such as radio signals, infrared signals or other electromagnetic radiation.

Although the present invention has been described with reference to preferred embodiments, workers skilled in the art will recognize that changes may be made in form and detail without departing from the spirit and scope of the invention.

What is claimed is:

1. A control system for a power machine having steerable wheels, comprising:

a joystick assembly having a joystick movable relative to a neutral position, the joystick assembly providing a joystick position signal indicative of a displacement of the joystick from the neutral position;

a filter coupled to the joystick assembly and configured to receive the joystick position signal and filter unwanted frequency components from the joystick position signal to provide a filtered position signal; and a controller providing a wheel steering control signal controlling a steering angle of the wheels based on the filtered position signal.

2. The control system of claim 1 wherein the filter comprises:

a filter circuit electrically filtering the joystick position signal.

3. The control system of claim 1 wherein the filter comprises:

a software filter component configuring the controller to provide the control signal based on the joystick position signal without the unwanted frequency components.

4. The control system of claim 1 wherein the control signal comprises a steering control signal indicative of desired steering of the wheels.

5. The control system of claim 1 wherein the control signal comprises a speed control signal indicative of a desired speed and fore/aft direction of the wheels.

6. The control system of claim 1 wherein the filter comprises a low pass filter.

7. The control system of claim 6 wherein the low pass filter is configured to filter frequency components in the position signal in excess of approximately 3 Hertz.

8. The control system of claim 6 wherein the low pass filter is configured to filter frequency components in the position signal in excess of approximately 2.5 Hertz.

9. A control system for a power machine having steerable wheels, comprising:

a joystick assembly having a joystick movable relative to a neutral position, the joystick assembly providing a joystick position signal indicative of a displacement of the joystick from the neutral position, wherein the joystick assembly comprises:

a hand grip;

a user actuable input coupled to the hand grip; and a joystick controller mounted to the handgrip and providing an output indicative of a position of the joystick and a state of the user actuable input;

a filter coupled to the joystick assembly and configured to receive the joystick position signal and filter unwanted frequency components from the joystick position signal to provide a filtered position signal; and a controller providing a wheel control signal controlling the wheels based on the filtered position signal.

10. The control system of claim 9 wherein the filter is implemented by the joystick controller.

11. A power machine, comprising:

a plurality of individually steerable wheels;

a plurality of steering motors coupled to the wheels to steer the wheels;

a traction motor driving rotation of the wheels;

a joystick assembly having a joystick movable relative to a neutral position, the joystick assembly providing a joystick position signal indicative of a displacement of the joystick from the neutral position;

a filter coupled to the joystick assembly and configured to receive the joystick position signal and filter unwanted frequency components from the joystick position signal to provide a filtered position signal; and a controller providing a wheel steering control signal to the steering motors and the traction motor to control a steering angle of the wheels based on the filtered position signal.

12. The power machine of claim 11 wherein the filter comprises:

a filter circuit electrically filtering the joystick position signal.

13. The power machine of claim 11 wherein the filter comprises:

a software filter component configuring the controller to provide the control signal based on the joystick position signal without the unwanted frequency components.

14. The power machine of claim 11 wherein the control signal comprises a steering control signal provided to the steering motors and indicative of desired steering of the wheels.

15. The power machine of claim 11 wherein the control signal comprises a speed control signal provided to the traction motor and indicative of a desired speed and fore/aft direction of the wheels.

16. The power machine of claim 11 wherein the filter comprises a low pass filter.

17. The power machine of claim 16 wherein the low pass filter is configured to filter frequency components in the position signal in excess of approximately 2.5 Hertz.

18. The power machine of claim 16 wherein the low pass filter is configured to filter frequency components in the position signal in excess of approximately 3 Hertz.

19. A power machine comprising:

a plurality of individually steerable wheels;

a plurality of steering motors coupled to the wheels to steer the wheels;

a traction motor driving rotation of the wheels;

a joystick assembly having a joystick movable relative to a neutral position, the joystick assembly providing a joystick position signal indicative of a displacement of the joystick from the neutral position, wherein the joystick assembly comprises:

a hand grip;

a user actuable input coupled to the hand grip; and a joystick controller mounted to the handgrip and providing an output indicative of a position of the joystick and a state of the user actuable input;

a filter coupled to the joystick assembly and configured to receive the joystick position signal and filter unwanted frequency components from the joystick position signal to provide a filtered position signal; and a controller providing a wheel control signal to the steering motors and the traction motor controlling the wheels based on the filtered position signal.

20. The power machine of claim 19 wherein the filter is implemented by the joystick controller.

21. A control system for a power machine having pivotable wheels comprising:

a joystick assembly having a joystick movable relative to a neutral position, the joystick assembly providing a joystick position signal indicative of a displacement of the joystick from the neutral position;

a low pass filter coupled to the joystick assembly and configured to receive the joystick position signal and filter frequency components in excess of 2.5 Hertz from the joystick position signal to provide a filtered position signal; and a controller providing a wheel control signal controlling the wheels, including wheel pivoting, based on the filtered position signal.

22. The control system of claim 21 wherein the low pass filter is configured to filter frequency components in excess of 3 Hertz.

23. The control system of claim 21 further comprising a speed sensor providing a signal indicative of wheel speed to the controller.

* * * * *